(12) United States Patent
Chapman

(10) Patent No.: US 12,659,157 B1
(45) Date of Patent: Jun. 16, 2026

(54) TOKENIZED ASSET MARKETS AND BLOCKCHAIN-EMBEDDED EMISSIONS OFFSETS

(71) Applicant: Gemini IP, LLC, New York, NY (US)

(72) Inventor: Jamie Chapman, New York, NY (US)

(73) Assignee: Gemini IP, LLC, New York, NY (US)

( * ) Notice: Subject to any disclaimer, the term of this patent is extended or adjusted under 35 U.S.C. 154(b) by 239 days.

(21) Appl. No.: 18/080,228

(22) Filed: Dec. 13, 2022

Related U.S. Application Data

(60) Provisional application No. 63/293,181, filed on Dec. 23, 2021, provisional application No. 63/290,347, filed on Dec. 16, 2021.

(51) Int. Cl.
| | |
|---|---|
| *H04L 9/32* | (2006.01) |
| *G06Q 20/36* | (2012.01) |
| *G06Q 50/06* | (2024.01) |

(52) U.S. Cl.
CPC ........... *H04L 9/3213* (2013.01); *G06Q 20/36* (2013.01); *G06Q 50/06* (2013.01)

(58) Field of Classification Search
CPC ....... H04L 9/3213; G06Q 20/36; G06Q 50/06
See application file for complete search history.

(56) References Cited

U.S. PATENT DOCUMENTS

| | | | | |
|---|---|---|---|---|
| 12,530,681 | B1 * | 1/2026 | Foster | ................. G06Q 20/3829 |
| 2020/0004788 | A1 * | 1/2020 | Qiu | ..................... G06F 16/9014 |

| | | | | |
|---|---|---|---|---|
| 2020/0111105 | A1 * | 4/2020 | Gupta | .................. G06Q 20/065 |
| 2021/0174446 | A1 * | 6/2021 | Chichilnisky | ...... G06Q 20/3674 |
| 2022/0027992 | A1 * | 1/2022 | Blevins | ................. H04L 9/3247 |
| 2022/0051261 | A1 * | 2/2022 | Vetas | ................... G06Q 30/018 |
| 2023/0049748 | A1 * | 2/2023 | Nguyen | ............. G06Q 20/4014 |
| 2023/0139137 | A1 * | 5/2023 | Slack | ...................... G06Q 40/04 |
| | | | | 705/37 |
| 2024/0187263 | A1 * | 6/2024 | Malepati | ................... H04L 9/50 |
| 2024/0346087 | A1 * | 10/2024 | Quigley | ............. G06Q 30/0631 |
| 2024/0354851 | A1 * | 10/2024 | Stolt | ...................... G06Q 50/02 |
| 2026/0004346 | A1 * | 1/2026 | Economides | .......... G06Q 40/04 |

FOREIGN PATENT DOCUMENTS

| | | | | |
|---|---|---|---|---|
| WO | WO-2022216679 | A1 * | 10/2022 | ............. G06Q 40/04 |

* cited by examiner

*Primary Examiner* — Hadi S Armouche
(74) *Attorney, Agent, or Firm* — Lee & Hayes, P.C.

(57) ABSTRACT

Disclosed are various embodiments for tokenized asset markets and blockchain embedded emission offsets. A computing device can identify a transaction and then identify a block in a blockchain, the block including a record of the transaction. The computing device can then identify a miner that created the block and calculate a carbon footprint for the transaction based at least in part on the identity of the miner. If the carbon footprint is less than a predefined threshold, a token can be issued that represents the carbon footprint associated with the transaction. The token representing the carbon footprint can then be transferred to a marketplace service for use in a tokenized asset market.

20 Claims, 5 Drawing Sheets

TOKENIZED ASSET MARKETS AND BLOCKCHAIN-EMBEDDED EMISSIONS OFFSETS

CROSS-REFERENCE TO RELATED APPLICATIONS

This application claims priority to, and the benefit of, U.S. Provisional Patent Application No. 63/290,347, filed on Dec. 16, 2021, and entitled "TOKENIZED ASSET MAR-KETS," which is incorporated by reference as if set forth herein in its entirety.

This application claims priority to, and the benefit of, U.S. Provisional Patent Application No. 63/293,181, filed on Dec. 23, 2021, and entitled "BLOCKCHAIN EMBEDDED EMISSIONS OFFSETS," which is incorporated by reference as if set forth herein in its entirety.

BACKGROUND

Asset markets are often illiquid and inaccessible to retail users. For example, individuals may be able to buy and sell gold, but are required to either buy and sell physical gold through a reseller, who may require the user to take possession. This makes purchasing and investing in gold illiquid and inaccessible due to the dependency on the existence of the reseller and other logistical issues. Alternatively, the individual could purchase shares in an exchange traded fund (ETF) that tracks the spot price or futures price of the underlying commodity, but ETFs may only be traded on certain exchanges and during limited hours through the use of a brokerage account, which the individual may or may not qualify for.

Markets for other assets may be even more illiquid. For example, the carbon credit market is highly illiquid. There are currently not any centralized exchanges globally where individuals can trade, buy, or sell carbon credits for the offsetting of carbon dioxide emissions. Instead, buyers and sellers must search for each other and negotiate the price and other terms of individual transactions. In some cases, buyers could be limited to the use of carbon offset services, where a customer can purchase and immediately retire carbon credits for a fee. However, these offset services do not allow customers to purchase carbon credits to buy and hold. Nor can owners of carbon credits easily sell their carbon credits to a carbon offset service. As a result, buyers and sellers may not be able to participate in the most cost-effective transactions or may be unable to find a counterparty to a transaction.

However, institutional investors may trade carbon credits via existing traditional financial exchanges. These exchanges can charge a large spread and often do not offer a user-friendly interface. Moreover, connecting to these markets may incur a compliance fee and require cost-prohibitive infrastructure. The fees are often opaque. As a result, retail investors are largely unable to participate in the carbon trading market.

Moreover, transactions on a blockchain are often energy intensive. For example, nodes that participate in blockchains that use proof-of-work (PoW) algorithms to generate new blocks can consume large amounts of electricity. For instance, Bitcoin nodes can consume large amounts of electricity as part of the mining process to create new blocks. The Bitcoin network can currently consume as much as 15 Gigawatts of electricity per day.

Bitcoin nodes can receive electricity from a variety of sources. For example, some bitcoin mining pools have purchased or repurposed decommissioned fossil fuel power plants for a dedicated source of electricity. Other bitcoin miners or mining pools rely upon the local electric grid to provide the needed electricity, which can be produced from a variety or a mix of sources, including fossil fuel power plants (e.g., coal, oil, and natural gas fired power plants), renewable energy sources (e.g., hydroelectric, geothermal, tidal, solar, or wind power plants), or other energy sources (e.g., nuclear power plants). In general, the renewal energy sources produce the least amount of pollution. Nuclear power plants tend to produce little to no air-pollution, but generate radioactive waste that can create long-term environmental issues. Fossil fuel power plants tend to be the most polluting sources of energy, creating large volumes of air pollution, carbon dioxide pollution, and other toxic by-products (e.g., coal ash and heavy metal pollution).

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
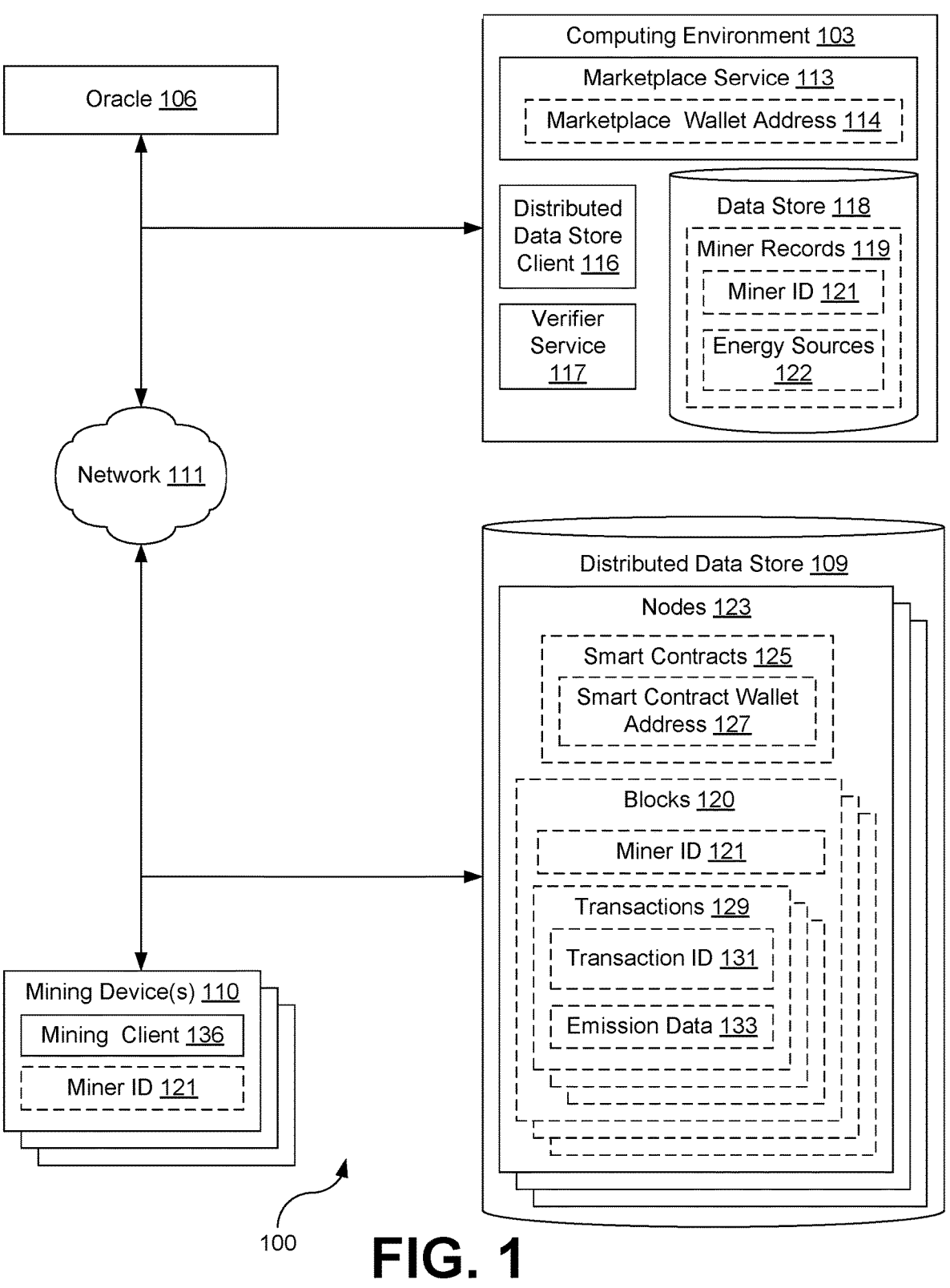
FIG. 1 is a drawing of a network environment according to various embodiments of the present disclosure.

Disclosed are various approaches for tokenizing commodities markets, such as carbon dioxide ($CO_2$) credit markets. Moreover, using blockchain technology provides the necessary technological infrastructure to facilitate a carbon credit trading market amongst all types of individuals, including retail investors, while providing transparent fees and an accessible, user-friendly trading interface. Additionally, the continuous 24/7 operation of a blockchain allows customers to globally trade carbon credits. As a result, customers are able to partake in more efficient markets and optimal price discovery amongst global market participants.

Accordingly, in various embodiments of the present disclosure, a cryptographic token can be created that represents an asset. For example, the cryptographic token may be created using a smart contract in response to receiving a notification that a predefined unit of the asset is available (e.g., one ton of $CO_2$ has been sequestered or a carbon credit for one ton of $CO_2$ is available). The smart contract can receive notifications that trigger the creation or minting of additional cryptographic tokens representing carbon credits using several methods. For example, carbon credit information could be sourced from an existing registry of verified carbon credits serving the voluntary market, such as a VCS-certified credit from the Verra registry. As another example, carbon credit information could be sourced from an existing compliance market, such as cap-and-trade markets like CARB, RGGI, or ETS, whereby regulatory authorities create and distribute, according to a predetermine distribution and carbon draw down plan, carbon allowances to primary polluters (e.g., an airline or oil refining company), and tokenized for use on the blockchain. These types of credits represent carbon that has not yet been emitted and can be used to represent one ton of carbon that has been emitted by a company per the respective regulatory body, or traded, in which case the purchasing company may purchase the credit to cover allowances beyond the purchaser's allowance. Carbon credit information could also be sourced from various companies, projects, or services that directly sequester carbon as a service (e.g., in order to sell carbon credits representing sequestered carbon). As discussed later, these information sources could be integrated into the smart contract using an oracle.

The cryptographic token can be made available on a respective blockchain, which makes the cryptographic token available to trade, buy, or sell using a marketplace service in some implementations of the present disclosure.

For example, if the cryptographic token represents carbon that has already been sequestered, the cryptographic token could be purchased in order for the purchaser to show that he or she has voluntarily paid to sequester carbon to offset his or her carbon emissions. Altruistic individuals could then submit the tokens to the smart contract, which can destroy or burn the tokens. This could be done by those who wish to purchase credits for already sequestered carbon in order to offset their own carbon pollution.

As another example, if the cryptographic token represents a carbon credit for a cap-and-trade market, the cryptographic token could be exchanged by primary polluters to indicate the amount of their carbon allowance. when the underlying asset has been consumed (e.g., a ton of $CO_2$ has been emitted into the atmosphere), the owner of the cryptographic token can return the cryptographic token to the smart contract. The smart contract can then destroy the cryptographic token (e.g., by transferring the cryptographic token to a burn address) in order to indicate that the carbon credit has been retired.

Also disclosed are various approaches for tracking carbon emissions related to blockchain transactions and embedding emissions data, including offsets for the emissions, into the blockchain. As a result, the carbon impact of individual blockchain transactions, such as the mining of cryptocurrencies or payments with cryptocurrencies, can be evaluated. Accordingly, parties can engage in carbon neutral transactions on the blockchain or could offset the carbon emissions related to blockchain transaction using tokenized commodities markets, such as carbon dioxide ($CO_2$) credit markets.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a network environment 100 according to various embodiments. The network environment 100 can include a computing environment 103, an oracle 106, distributed data store 109, and one or more mining devices 110, which can be in data communication with each other via a network 111. Although depicted separately for clarity, it should be noted that individual computers within the computing environment 103 can also function as members of the distributed data store 109 in various embodiments of the present disclosure.

The network 111 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 111 can also include a combination of two or more networks 111. Examples of networks 111 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks, computer banks, or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. At least one of the components executed by the computing environment 103 can include a marketplace service 113, which can be associated with a marketplace wallet address 114. In some implementations, a distributed data store client 116 could also be executed by the computing environment. Although depicted separately, the distributed data store client 116 could be implemented as a component of the marketplace service 113 in various embodiments of the present disclosure. In addition, some implementations could also include a verifier service 117 that could be executed by the computing environment 103. Other applications, services, processes, systems, engines, or functionality not discussed in detail herein may also be executed by the computing environment 103.

Also, various data can be stored in a data store 118 that is accessible to the computing environment 103. The data store 118 can be representative of a plurality of data stores 118, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 118 is associated with the operation of the various applications or functional entities described below. This data can include miner records 119, and potentially other data.

Each miner record 119 can represent information associated with one or more mining devices 110 operated by an individual or entity. For example, a miner record 119 could represent information about a mining pool that includes a plurality of mining devices 110 operating in cooperation to create new blocks 120 of a blockchain. Alternatively, the miner record 119 could represent information about an individual that owns and/or operates one or more mining devices 110.

Accordingly, each miner record 119 could include information such as a miner identifier 121 and energy sources 122. The miner identifier 121 can represent the unique identifier of a mining device 110 or the operator of a mining device 110. Energy sources 122 represent data related to one or more energy sources 122 used by a mining device 110 operated by a miner. For example, the energy sources 122 could identify the sources of electrical power (e.g., renewables, fossil fuels, etc.) used by the mining device(s) 509 of the miner. Where multiple sources of electrical power are utilized, the energy sources 122 in the miner record 119 could also include information about the ratio or relative makeup of different sources of electricity for the mining device(s) 509.

Data for the energy sources 122 could be obtained from a variety of sources. For example, a miner could voluntarily provide data regarding the sources of electricity the miner uses. To ensure the accuracy and veracity of the data, it could be audited by an independent third-party.

The distributed data store 109 can represent a data storage network that is formed from multiple computing devices acting as nodes 123, in the distributed data store 109. In some implementations, any computing device could participate as a node of the distributed data store 109, including one or more computing devices of the computing environment 103. In general, each node can store a copy of the data stored in the distributed data store 109. When data is to be written to the distributed data store 109, each node can communicate with other nodes of the distributed data store 109 to validate and/or coordinate the storage of new records or data to the distributed data store 109. As an illustrative example, the distributed data store 109 could include a blockchain which uses a proof-of-work, proof-of-stake, or proof-of-authority protocol to validate new blocks of data stored on the blockchain. Various types of data can be stored by the distributed data store 109.

For example, one or more smart contracts 125 can also be stored by the nodes 123 of the distributed data store 109. Smart contracts 125 are executable programs that are both stored in the distributed data store 109 and executable by the nodes of the distributed data store 109. The smart contract 125 can be executed automatically when one or more predetermined conditions are met. The smart contract 125 can also be called or invoked by a node of the distributed data store 109 or a client interacting with the distributed data store 109, such as the distributed data store client 116.

In various embodiments of the present disclosure, a smart contract 125 could be executed to create, generate, issue or otherwise "mint" cryptographic tokens that represent an asset. These cryptographic tokens could be fungible or non-fungible as desired for various implementations of the present disclosure. For example, the smart contract 125 could create cryptographic tokens that represent sequestered units of carbon dioxide ($CO_2$) in response to receiving a notification from the oracle 106 that additional units of $CO_2$ have been sequestered as part of a carbon capture or carbon offset program (e.g., a number of trees being planted to sequester the unit of $CO_2$). As another example, the smart contract 125 could create cryptographic tokens that represent emissions allowances in cap-and-trade or similar compliance markets. Cryptographic tokens representing other assets or commodities could be similarly minted or issued in response to receiving appropriate information from the oracle 106.

In some implementations, the smart contract 125 could transfer newly minted tokens to the marketplace wallet address 114 of the marketplace service 113. This would allow the newly minted tokens to be purchased, traded, or exchanged by users of the marketplace service 113.

The smart contract 125 could also be executed to destroy issued tokens, such as by receiving a command to destroy or "burn" the tokens. For example, if someone purchased a cryptographic token to offset an amount of $CO_2$ they produce, the individual could send a request to the smart contract 125 to destroy the cryptographic token. This request could be sent using the user interface provided by a user's wallet storing the tokens. For example, the user interface could include a "destroy" or "burn" command that would cause the wallet to send the tokens to the burn address or send the tokens to the smart contract 125 with a request to destroy or "burn" the tokens. The smart contract 125 could accomplish this by sending the cryptographic token to a dead or burn wallet address, which can receive tokens but cannot subsequently transfer tokens.

Each smart contract 125 can also be associated with a smart contract wallet address 127. The smart contract wallet address 127 can represent the author or publisher of the smart contract 125 and/or act as an identifier of the smart contract 125 in the distributed data store 109. For example, the smart contract wallet address 127 could be computed from or derived from the public key of a public-private key pair controlled by the author or publisher of the smart contract 125.

The marketplace service 113 can be executed to facilitate the acquisition and/or transfer of cryptographic assets between users of the marketplace service 113. Examples of such cryptographic assets can include cryptographic currencies or cryptographic tokens, including both fungible and non-fungible tokens (NFTs). The marketplace service 113 could, for example, facilitate the purchase, sale, trade, or exchange of the cryptographic assets between users. Users could also withdraw cryptographic currencies or tokens from a marketplace wallet address 114 to their own, personal wallet addresses. Likewise, users could also deposit cryptographic currencies or tokens to their account by transferring cryptographic currencies or tokens to the marketplace wallet address 114.

The marketplace service 113 can be associated with a marketplace wallet address 114, which could be computed from or derived from the public key of a public-private key pair controlled by the owner or operator of the marketplace service 113. The marketplace wallet address 114 can represent the owner or operator of the marketplace service 113 and/or act as an identifier of the owner or operator of the marketplace service 113 in the distributed data store 109. Although a marketplace service 113 could have multiple marketplace wallet addresses 114, in some implementations the marketplace service 113 could use a single marketplace wallet address 114 for multiple purposes (e.g., an omnibus wallet or wallet address).

The distributed data store client 116 can be executed to facilitate the integration of the marketplace service 113 with the distributed data store 109. The distributed data store client 116 can also be used by the marketplace service 113 to read data stored in the distributed data store 109 as needed. Accordingly, in some implementations, the distributed data store client 116 could include a node 123 of the distributed data store 109.

The verifier service 117 can be executed to identify individual transactions 129 stored in blocks 120 of a blockchain and to establish or verify the carbon footprint of an individual transaction 129. For example, the verifier service 117 could identify the miner identifier 121 of the miner for a block 129 containing a transaction 129. The verifier service 117 could then evaluate the energy sources 122 identified in the miner record 119 linked to the miner identifier 121 and determine the carbon footprint of the transaction 129.

As previously mentioned, one or more nodes 123 may also be in data communication with each other and with other devices in the computing environment 103 or with other mining devices 110. Each node 123 may be a member of, or a participant in, the distributed data store 109. The nodes 123 can act as a peer-to-peer network, where individual nodes 123 can communicate with each other using various consensus protocols to provide an immutable, eventually consistent distributed data store 109. Examples of such a distributed data store 109 can include blockchains and similar data structures. The individual nodes 123 can also store copies of one or more blocks 120.

Each block 120 in a blockchain can include data related to records of one or more transactions 129. Each block 120 can include the miner identifier 121 of the miner that created the block 120. Each block 120 can also include records of the individual transactions 129 stored in the block 120. Each transaction 129 can include a transaction identifier 131 that uniquely identifies the transaction 129 with respect to other transactions 129 recorded in the block 120 specifically and the blockchain generally. In some implementations, each transaction 129 can also include emissions data 133, representing the carbon footprint or other pollution metrics related to the processing or recording of the transaction 129.

The oracle 106 can represent a service that can facilitate the exchange of information between the smart contract 125 and external data sources, feeds, or repositories. For example, an inbound oracle 106 can provide the smart contract 125 with data from additional data sources or information feeds external to the smart contract 125, thereby allowing the smart contract 125 in response to various conditions or triggers occurring. As another example, an outbound oracle 106 can export or publish information from the smart contract 125 to external data sources or information feeds.

The oracle 106 could, for example, be linked to one or more direct air carbon capture operators. As the direct air carbon capture providers sequester units of $CO_2$, they could provide the information to oracle 106. The oracle 106 could provide this information to the smart contract 125, thereby causing the smart contract 125 to mint new cryptographic tokens representing sequestered units of $CO_2$.

As another example, the oracle 106 could be linked to one or more forestry services. As the forestry services plant additional trees sufficient to sequester an additional unit of $CO_2$, the forestry services could notify the oracle 106. The oracle 106 could then provide this information to the smart contract 125, thereby causing the smart contract 125 to mint new cryptographic tokens representing sequestered units of $CO_2$.

Each mining device 110 can represent a computing device that is in data communication with the nodes 123, the computing environment 503, and/or other mining devices 110. Accordingly, a mining device 110 can include general purpose personal computers or dedicated computing devices that contain application specific integrated circuits (ASICs) configured to create new blocks 120. In some implementations, a mining device 110 could also act as a node 123. For purposes of clarity, however, the mining devices 110 are depicted separately from the nodes 123.

Each mining device 110 can include both a mining client 136 and a miner identifier 121 representing the owner or operator of the mining device 110. The mining client 136 can be executed to receive requests to process transactions 129 and create new blocks 120 for the blockchain memorializing the transactions 129.

Figure 2:
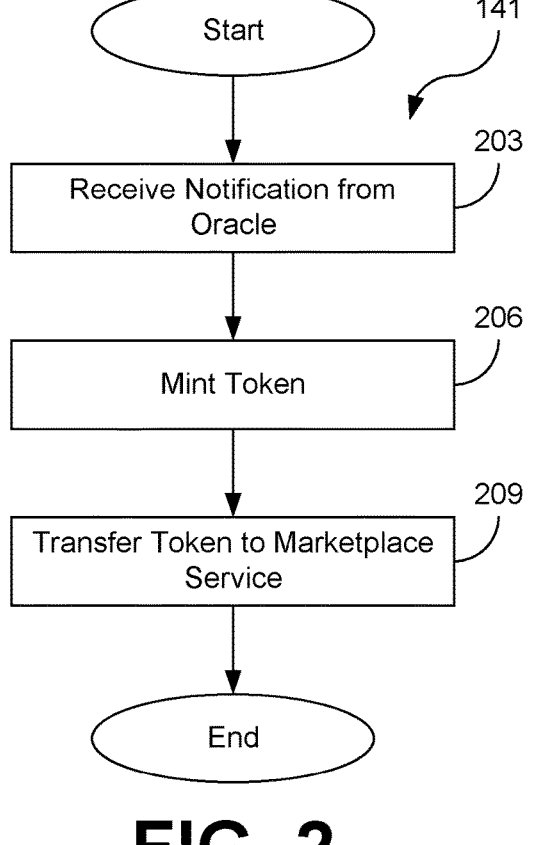
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the smart contract 125. The flowchart of FIG. 2 provides merely an example of the many different types of functional arrangements that can be employed to implement the operation of the depicted portion of the smart contract 125. As an alternative, the flowchart of FIG. 2 can be viewed as depicting an example of elements of a method implemented within the network environment 100.

Beginning with block 203, the smart contract 125 can receive a notification from an oracle 106 that one or more units of an asset are available to be tokenized. For example, the message could indicate the one or more units of carbon dioxide ($CO_2$) have been sequestered or captured (e.g., one or more tons).

Then, at block 206, the smart contract 125 can mint the respective cryptographic tokens. The newly minted cryptographic tokens can be stored in the smart contract wallet associated with the smart contract wallet address 127.

Next, at block 209, one or more of the cryptographic tokens can be transferred from the smart contract wallet address 127 to the marketplace wallet address 114.

In some implementations, the functionality of blocks 206 and 209 can be combined. For example, if the smart contract 125 is published or owned by the owner of the marketplace service 113, the newly minted tokens could be issued or stored directly to the marketplace wallet associated with the marketplace wallet address 114.

Figure 3:
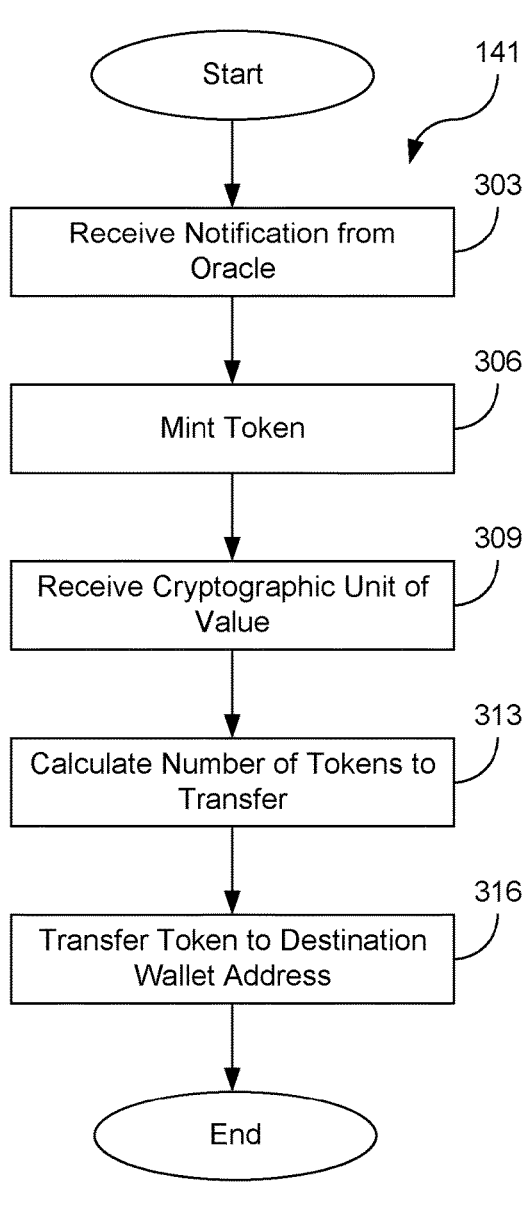
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the smart contract 125. The flowchart of FIG. 3 provides merely an example of the many different types of functional arrangements that can be employed to implement the operation of the depicted portion of the smart contract 125. As an alternative, the flowchart of FIG. 3 can be viewed as depicting an example of elements of a method implemented within the network environment 100.

Beginning with block 303, the smart contract 125 can receive a notification from an oracle 106 that one or more units of an asset are available to be tokenized. For example, the message could indicate the one or more units of carbon dioxide ($CO_2$) have been sequestered or captured (e.g., one or more tons).

Then, at block 306, the smart contract 125 can mint the respective cryptographic tokens. The newly minted cryptographic tokens can be stored in the smart contract wallet associated with the smart contract wallet address 127.

Next, at block 309, the smart contract 125 can receive a cryptographic unit of value, such as one or more cryptocurrencies (e.g., stable coins, Bitcoin, Ethereum, etc.). The cryptographic unit of value could be received as part of a purchase from the smart contract 125 for one or more of the minted tokens. In some instances, a destination wallet address can also be received at block 309.

Proceeding to block 313, the smart contract 125 could evaluate the number of tokens to provide in response to receipt of the cryptographic unit of value by determining the current price of the tokens. First, the smart contract 125 could determine the current price of the tokens previously minted at block 306. Then, the smart contract 125 could determine the value of the cryptographic unit of value. The smart contract 125 could then multiply the current price of the tokens by the value of the cryptographic unit of value to determine the number of tokens purchased.

The smart contract 125 could determine the current price of the tokens previously minted at block 306 using a variety of approaches, such as evaluating price data from an oracle 106 the reports the current price of the tokens or the current price of the underlying asset. For example, the oracle 106 could provide the average price of the tokens as reflected across a plurality of exchanges, which could be represented in fiat currency, cryptocurrency, or cryptographic tokens. As another example, if the tokens represented an underlying asset, the oracle 106 could provide the price of the underlying asset. For example, if each token minted at block 306 represented a carbon credit for one ton of sequestered carbon, the oracle 106 could provide the price for a ton of sequestered carbon, as reported from an appropriate source or sources.

The smart contract 125 could also determine the value of the cryptographic unit of value using a variety of approaches. For example, if the cryptographic unit of value were a stablecoin (e.g., a cryptographic token, the value of which is pegged to a defined fiat currency), the smart contract 125 could calculate that the amount of the cryptographic unit of value is the same as an equivalent amount of the respective fiat currency. As another example, an oracle 106 could be used to collect and provide the average value of a cryptocurrency or cryptographic token across one or more exchanges.

Moving on to block 316, the smart contract 125 can provide an appropriate amount of tokens minted at block 306 to a destination wallet address specified at block 309.

Figure 4:
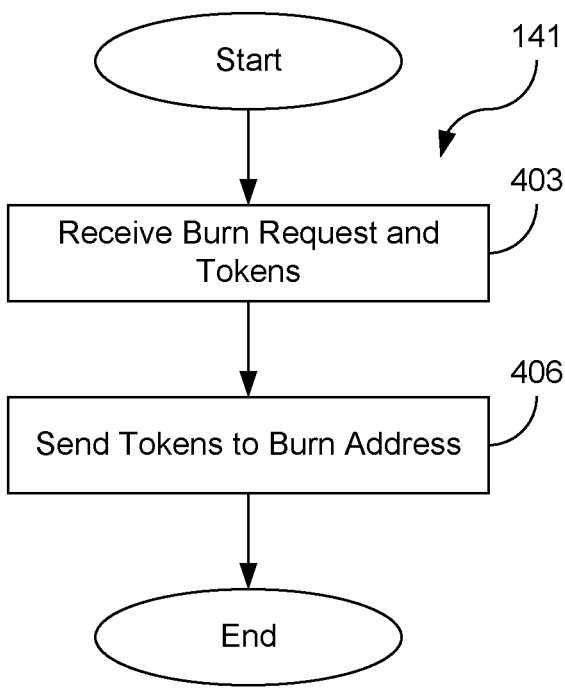
FIG. 4 is a flowchart illustrating one example of functionality implemented as portions of an application executed in a computing environment in the network environment of FIG. 1 according to various embodiments of the present disclosure.

Referring next to FIG. 4, shown is a flowchart that provides one example of the operation of a portion of the smart contract 125. The flowchart of FIG. 4 provides merely an example of the many different types of functional arrangements that can be employed to implement the operation of the depicted portion of the smart contract 125. As an alternative, the flowchart of FIG. 4 can be viewed as depicting an example of elements of a method implemented within the network environment 100.

Beginning with block 403, the smart contract 125 can receive a request to destroy or "burn" one or more asset tokens, such as those minted at block 206 of FIG. 2 or block 306 of FIG. 3. The burn request may be received in response to the underlying asset having been consumed or offset. For example, if the tokens represent sequestered units of carbon dioxide ($CO_2$) to be used as carbon offsets, the tokens could be received in response to the owner producing an equivalent amount of carbon dioxide that is released into the atmosphere.

Then, at block 406, the smart contract 125 could cause the tokens received at block 403 to be destroyed or "burned." For example, the smart contract 125 could transfer the tokens to a dead or "burn" address, which is an address in the distributed data store 109 (e.g., a blockchain address), which can receive tokens, but from which tokens cannot be transferred.

Figure 5:
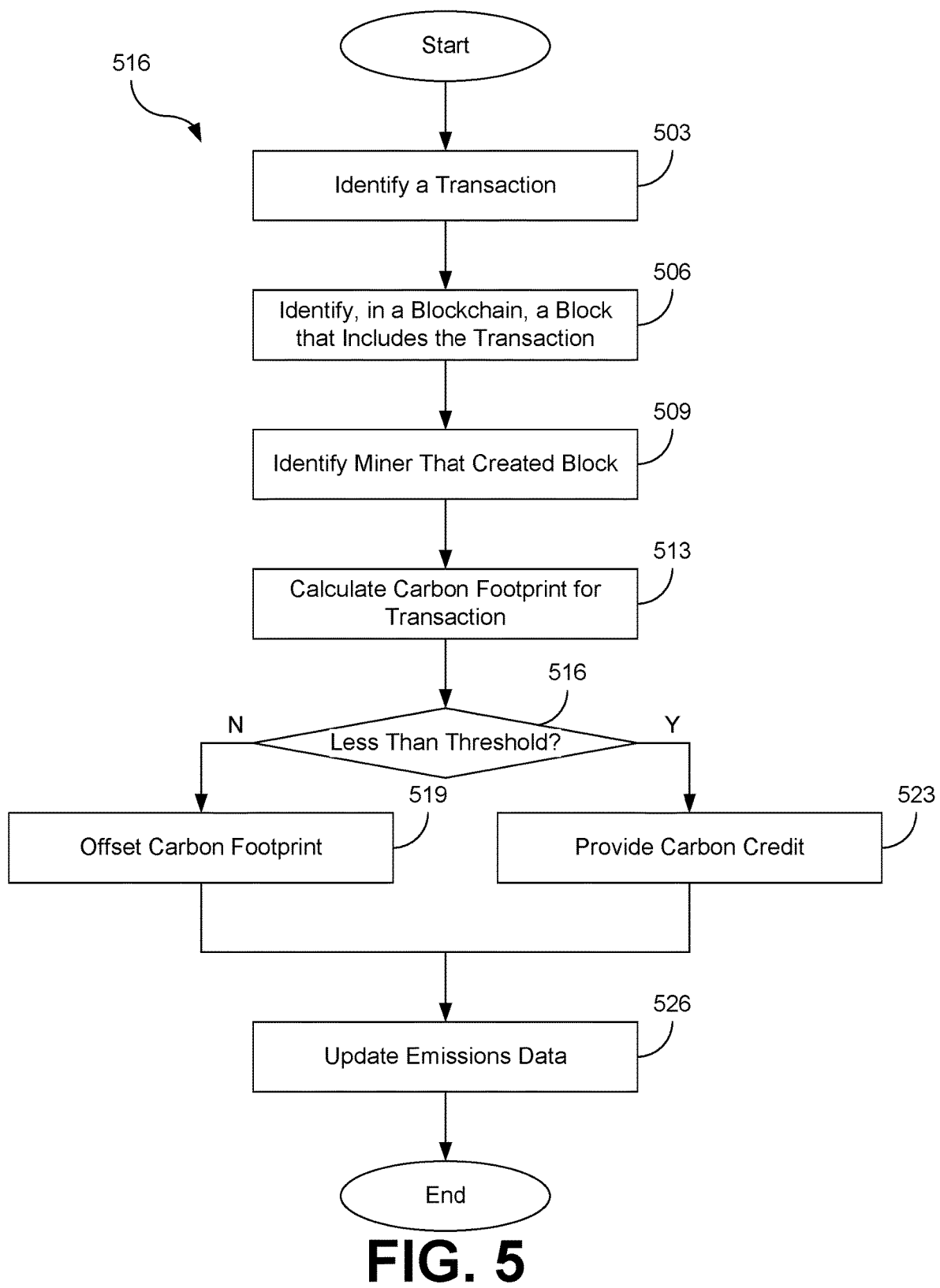
FIG. 5 is a flowchart illustrating one example of functionality implemented as portions of an application executed in a computing environment in the network environment of FIG. 1 according to various embodiments of the present disclosure.

Referring next to FIG. 5, shown is a flowchart that provides one example of the operation of a portion of the verifier service 117. The flowchart of FIG. 5 provides merely an example of the many different types of functional arrangements that can be employed to implement the operation of the depicted portion of the verifier service 117. As an alternative, the flowchart of FIG. 5 can be viewed as depicting an example of elements of a method implemented within the network environment 100.

Beginning with block 503, the verifier service 117 can identify a transaction 129 to be evaluated. For example, the verifier service 117 could be configured to identify all transactions 129 posted to blocks 120 of a blockchain or identify only those transactions 129 in a block 120 with a miner identifier 121 matching a previously specified miner identifier 121. This could occur, for example, if a miner has contracted with the verifier service 117 to have its emissions footprint regularly audited. However, the verifier service 117 could also be requested to evaluate the carbon footprint of a particular transaction 129.

Then, at block 506, the verifier service 117 can identify the block 120 containing the transaction 129 specified at block 503. For example, the verifier service 117 could search for a block 120 with a transaction 129 containing a transaction identifier 131 matching a transaction identifier 131 specified at block 503. As another example, the verifier service 117 could search for a most recently generated block 120 with a miner identifier 121 that matches a miner identifier 121 specified at block 503.

Next, at block 509, the verifier service 117 can identify the miner that created the block. For instance, the verifier service 117 could identify the miner identifier 121 embedded in the block 120. The verifier service 117 could then search for a miner record 119 associated with the miner identifier 121.

Moving on to block 513, the verifier service 117 can calculate the carbon footprint associated with the transaction 129. For example, the verifier service 117 could determine, based on the energy sources 122 listed in the miner record 119, the type or mix of electricity sources used by the miner. The verifier service 117 could then estimate or calculate the amount of electricity used to generate the block 120 based at least in part on the amount of electricity consumed by the mining device(s) 110 of the miner (e.g., factoring in the relative efficiency of ASIC-based mining devices 110 compared to general purpose computers used for mining). The verifier service 117 could then allocate the amount of electricity consumed to the respective energy sources 122 specified in the miner record 119. For example, if a miner were using only renewable energy sources 122, then the verifier service 117 could determine that the entire transaction 129 was carbon neutral (e.g., no new carbon dioxide was emitted by the miner to produce the block 120 containing the transaction 129). As another example, if the miner were using 90% renewable electricity, then the verifier service 117 could calculate how much carbon would be emitted by the energy sources 122 of the miner to generate the remaining 10% of the electricity consumed by the mining device(s) 509 of the miner to create the block 120.

Proceeding to block 516, the verifier service 117 can determine whether carbon footprint is less than a specified threshold. If the carbon footprint associated with the transaction 129 is greater than the threshold, then the process can proceed to block 519. However, if the carbon footprint associated with the transaction 129 is less than the threshold, the process could proceed to block 523. For example, the verifier service 117 could be configured to only to proceed to block 519 if the carbon footprint for the transaction 129 is more than a minimal amount in order to avoid accidentally causing additional carbon to be emitted. If the carbon footprint were less than the threshold, the process could proceed to block 523. As another example, the verifier service 117 could be configured so that if the transaction 129 (or any transaction 129) is not carbon neutral (e.g., the electricity consumed to create the block 120 storing the transaction 129 was not entirely sourced from renewable energy sources), then the process will proceed to block 519. In these implementations, the verifier service 117 would only proceed to block 523 for carbon neutral or carbon negative transactions 129.

If the process proceeds to block 519, the verifier service 117 can automatically offset the carbon footprint of the transaction 129. For example, the verifier service 117 could attempt to purchase carbon credits through a broker, exchange, or other service where carbon credits can be purchased, transferred, or sold, such as the marketplace service 113.

However, if the process proceeds to block 523, the verifier service 117 can, in some implementations, provide or offer a carbon credit to the miner or others. For example, the verifier service 117 could issue a cryptocurrency token that represents the amount of carbon that would have been consumed if the miner of the block 120 containing the transaction 129 had exclusively utilized fossil-fuel based sources of electricity. This token can then be utilized as a measure of the amount of carbon that was withheld from the atmosphere, or it could be transferred or resold on the secondary market as a carbon credit or offset (e.g., by transferring the cryptocurrency token to the marketplace service 113).

Once the process proceeds to block 526, the verifier service 117 can update the emissions data 133 associated with the transaction 129. For example, the verifier service 117 could add information about the carbon offset obtained at block 519 to the emissions data 133 for the transaction 129. As another example, the verifier service 117 could edit the emissions data 133 to reflect that the transaction 129 was carbon neutral. If carbon credits were created and/or provided to others at block 523, the amount of carbon credits could be added to the emissions data 133 to reflect the amount of carbon dioxide emissions that were offset by the miner.

Because blockchains are immutable distributed ledgers, the verifier service 117 may need to create and save a new transaction 129 to a new block 120 in the blockchain. The new version of the record of the transaction 129 could include the updated emissions data 133. To ensure that generating this subsequent block 120 does not impact or alter the carbon emissions calculation, the verifier service 117 could be configured to ensure that only miners or mining devices 110 that operate on a carbon neutral basis (e.g., they exclusively utilize renewable energy sources) are involved in created the block 120 containing new version of the record of the transaction 129.

Figure 6:
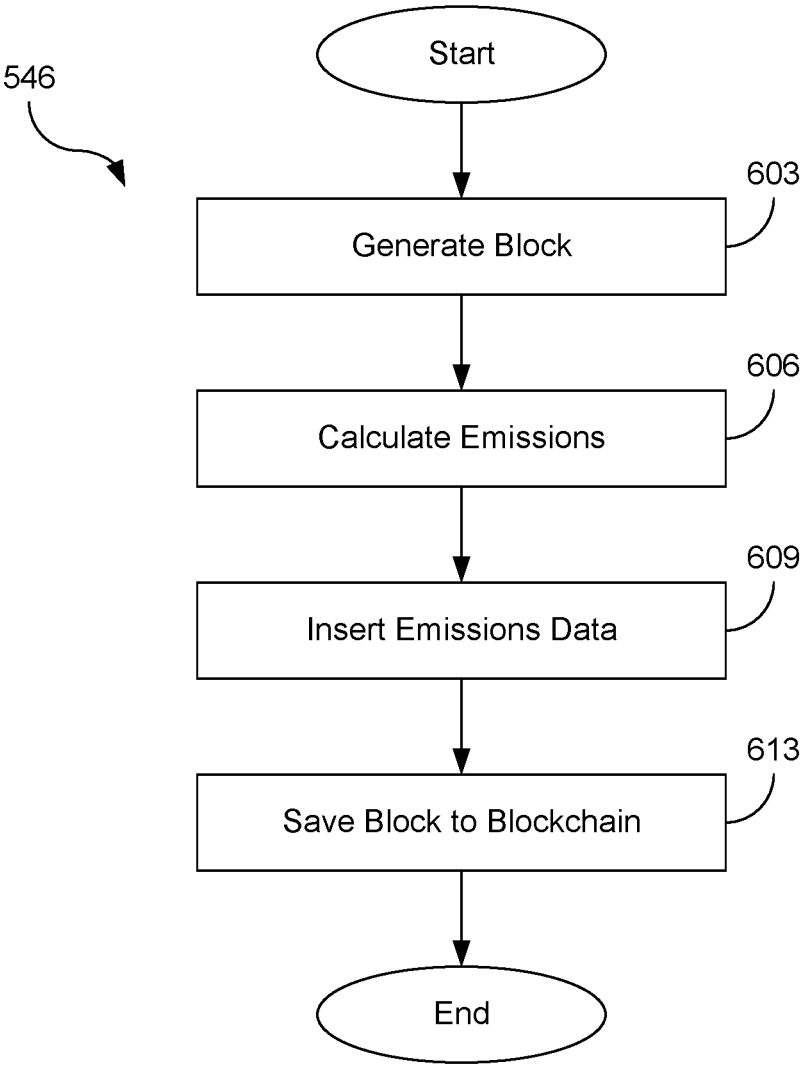
FIG. 6 is a flowchart illustrating one example of functionality implemented as portions of an application executed in a computing environment in the network environment of FIG. 1 according to various embodiments of the present disclosure.

Referring next to FIG. 6, shown is a flowchart that provides one example of the operation of a portion of the mining client 136. The flowchart of FIG. 6 provides merely an example of the many different types of functional arrangements that can be employed to implement the operation of the depicted portion of the mining client 136. As an alternative, the flowchart of FIG. 6 can be viewed as depicting an example of elements of a method implemented within the network environment 100.

Beginning with block 603, the mining client 136 of a miner could create a block 120 for a blockchain. The right to create a block 120 could be established using various consensus protocols (e.g., proof of work). As part of the block 120 creation process, the mining client 136 could insert the miner identifier 121 of the miner and one or more transactions 129.

Then, at block 606, the mining client 136 could calculate the emissions generated by creating the block 120. For example, if the mining client 136 were executed by mining devices 110 that were powered exclusively by renewable energy, then the mining client 136 could calculate that the carbon emissions were zero. However, if the mining devices 110 were powered by a mix of renewable and non-renewable energy, then the mining client 136 could prorate the amount of electricity consumed by the mining devices 110 to calculate the amount of carbon emitted based on the amount of electricity consumed from the non-renewable energy sources.

Next, at block 609, the mining client 136 could insert the amount of carbon calculated at block 606 in the emission data 133 of the transaction 129. In some implementations, the amount of carbon emitted could be prorated across the plurality of transactions 129 stored in the block 120. In other implementations, the entire amount of carbon emitted due to the production of the block 120 could be stored in the emissions data 133 of each transaction 129 included in the block 120.

Subsequently, at block 613, once the mining client 136 has updated the emissions data 133 for the transactions 129 included in the block 120, the block 120 can be saved to the distributed data store 109 (e.g., saved to a blockchain).

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

The invention claimed is:

1. A system, comprising:

a computing device comprising a processor and a memory; and machine-readable instructions stored in the memory that, when executed by the processor, cause the computing device to at least:

generate, by a cryptocurrency exchange platform and in response to receiving a message that a predefined unit of an asset is available, a smart contract configured to be utilized for minting tokens representing units of carbon-dioxide (CO2) that have been sequestered, wherein the smart contract includes a condition for minting the tokens, wherein generation of the smart contract includes selecting attributes of the smart contract from multiple smart contract attributes based on an information source from which CO2 sequestration notifications are to be received;

receive a notification from an oracle that a unit of CO2 has been sequestered, wherein the notification is received from a third party system configured to send a message to the oracle when the unit of CO2 has been sequestered;

determine that the condition of the smart contract has been met by confirming, from the notification, that the unit of CO2 has been sequestered; and mint, by executing the smart contract via the cryptocurrency exchange platform and based at least in part on the condition being met, a token representing the unit of CO2 that has been sequestered to a blockchain such that the token is available for transfer utilizing the blockchain, wherein minting the token comprises associating the token with a type of asset of the unit of CO2 that has been sequestered.

2. The system of claim 1, wherein the machine-readable instructions further cause the computing device to at least transfer the token to a marketplace wallet address.

3. The system of claim 1, wherein the machine-readable instructions further cause the computing device to at least:

receive a cryptographic unit of value; and in response to receiving the cryptographic unit of value, transfer the token representing the unit of CO2 to a destination wallet address.

4. The system of claim 1, wherein the machine-readable instructions further cause the computing device to at least:

receive a burn request, the burn request comprising the token; and destroy the token by transferring the token to a burn address.

5. The system of claim 1, wherein the oracle is linked to a direct air carbon capture operator.

6. The system of claim 1, wherein the oracle is linked to one or more forestry services.

7. A method, comprising:

generating, by a cryptocurrency exchange platform and in response to receiving a message that a predefined unit of an asset is available, a smart contract configured to be utilized for minting tokens representing units of carbon-dioxide (CO2) that have been sequestered, wherein the smart contract includes a condition for minting the tokens, wherein generation of the smart contract includes selecting attributes of the smart contract from multiple smart contract attributes based on an information source from which CO2 sequestration notifications are to be received;

receiving a notification from an oracle that a unit of CO2 has been sequestered, wherein the notification is received from a third party system configured to send a message to the oracle when the unit of CO2 has been sequestered;

determining that the condition of the smart contract has been met by confirming, from the notification, that the unit of CO2 has been sequestered; and minting, by executing the smart contract via the cryptocurrency exchange platform and based at least in part on the condition being met, a token representing the unit of CO2 that has been sequestered to a blockchain such that the token is available for transfer utilizing the blockchain, wherein minting the token comprises associating the token with a type of asset of the unit of CO2 that has been sequestered.

8. The method of claim 7, further comprising transferring the token to a marketplace wallet address.

9. The method of claim 7, further comprising:

receiving a cryptographic unit of value; and in response to receiving the cryptographic unit of value, transferring the token representing the unit of CO2 to a destination wallet address.

10. The method of claim 7, further comprising:

receiving a burn request, the burn request comprising the token; and destroying the token by transferring the token to a burn address.

11. The method of claim 7, wherein the oracle is linked to a direct air carbon capture operator.

12. The method of claim 7, wherein the oracle is linked to one or more forestry services.

13. A system, comprising:

a computing device comprising a processor and a memory; and machine-readable instructions stored in the memory that, when executed by the processor, cause the computing device to at least:

identify a transaction;

identify a block in a blockchain, the block comprising a record of the transaction;

identify a miner that created the block;

calculate a carbon footprint for the transaction based at least in part on an identity of the miner;

generate, by a cryptocurrency exchange platform and in response to receiving a message that a predefined unit of an asset is available, a smart contract configured to be utilized for minting tokens representing units of carbon-dioxide (CO2) associated with carbon footprints, wherein the smart contract includes a condition for minting the tokens, wherein generation of the smart contract includes selecting attributes of the smart contract from multiple smart contract attributes based on an information source from which CO2 sequestration notifications are to be received;

determine that the condition of the smart contract has been met by confirming the carbon footprint; and mint, by executing the smart contract via the cryptocurrency exchange platform and based at least in part on the condition being met, a token representing a unit of CO2 associated with the carbon footprint to the blockchain such that the token is available for transfer utilizing the blockchain, wherein minting the token comprises associating the token with a type of asset of the unit of CO2 that has been sequestered.

14. The system of claim 13, wherein the machine-readable instructions that cause the computing device to at least calculate the carbon footprint for the transaction based at least in part on the identity of the miner further cause the computing device to at least:

evaluate a miner record for the miner to determine an energy source of the miner; and calculate an amount of carbon emitted by the miner based at least in part on the energy source of the miner.

15. The system of claim 13, wherein the machine-readable instructions that cause the computing device to at least calculate the carbon footprint for the transaction based at least in part on the identity of the miner further cause the computing device to at least:

determine an electric efficiency of the miner; and calculate an amount of carbon emitted by the miner based at least in part on the electric efficiency of the miner.

16. The system of claim 15, wherein the electric efficiency of the miner is based at least in part on a type of mining device of the miner.

17. The system of claim 13, wherein the machine-readable instructions further cause the computing device to at least:

determine that the carbon footprint is less than a predefined threshold; and issue the token representing a carbon credit based at least in part on the carbon footprint associated with the transaction in response to a determination that the carbon footprint is less than the predefined threshold.

18. The system of claim 17, wherein the machine-readable instructions further cause the computing device to at least transfer the token representing the carbon footprint to a marketplace service.

19. The system of claim 17, wherein the carbon credit represents a difference between the carbon footprint of the transaction and the predefined threshold.

20. The system of claim 13, wherein the machine-readable instructions further cause the computing device to at least:

determine that the carbon footprint is less than a predefined threshold; and save a message to the blockchain referencing the transaction, wherein the message indicates that the carbon footprint is less than the predefined threshold.

\*   \*   \*   \*   \*